United States Patent [19]

Boettner

[11] Patent Number: 4,718,931
[45] Date of Patent: Jan. 12, 1988

[54] METHOD OF CONTROLLING MELTING IN A COLD CROWN GLASS MELTER

[75] Inventor: George B. Boettner, Corning, N.Y.

[73] Assignee: Corning Glass Works, Corning, N.Y.

[21] Appl. No.: 11,031

[22] Filed: Feb. 5, 1987

[51] Int. Cl.⁴ ............................................. C03B 3/00
[52] U.S. Cl. ........................................... 65/29; 65/27;
65/134; 65/162
[58] Field of Search ...................... 65/27, 29, 134, 162

[56] References Cited
U.S. PATENT DOCUMENTS

| | | | |
|---|---|---|---|
| 2,368,937 | 2/1945 | McGillin et al. | 65/162 X |
| 3,208,841 | 9/1965 | Burch | 65/179 |
| 3,438,518 | 4/1969 | Aerts | 65/29 X |
| 3,573,019 | 3/1971 | Rees | 65/29 |
| 4,002,448 | 1/1977 | Griffith et al. | 65/29 |
| 4,429,402 | 1/1984 | Carley | 373/37 |
| 4,478,628 | 10/1984 | Dunn | 65/29 |

OTHER PUBLICATIONS

Handbook of Glass Manufacture, vol. 1, pp. 20-23.

Primary Examiner—Arthur Kellogg
Attorney, Agent, or Firm—Burton R. Turner; A. L. Michaelsen

[57] ABSTRACT

A method is set forth for controlling the height of batch material on the surface of a molten bath in a cold-crown or vertical melting furnace by measuring the level of the upper surface of the batch material, the level of the fusion line between the batch and bath, and the effective hydrostatic head of the molten glass and batch material thereon over a predetermined height at such known fusion line level. The thickness of the batch blanket is then determined from the level of the fusion line and the measured level of the top of the batch blanket, and power input and rate of batch distribution are controlled to maintain such desired levels and accordingly a predetermined batch thickness, by continuously monitoring the level of the batch material and the effective hydrostatic head.

15 Claims, 2 Drawing Figures

METHOD OF CONTROLLING MELTING IN A COLD CROWN GLASS MELTER

BACKGROUND OF THE INVENTION

The present invention relates to improvements in glass melting furnaces. In particular, the invention relates to improvements in controlling the melting of batch materials in a cold-crown or vertical glass melting furnace.

Various problems are encountered in controlling the melting of cold-crown glass melting units which are not present in the standard fuel-fired hot crown melting furnace. That is, the usual glass melting tank of the prior art had a free surface of molten glass, with batch material being supplied at one end as shown in U.S. Pat. No. 3,208,841. Heat was supplied to melt the batch material on the surface of the molten glass through the use of combustible fuel supplied over the surface thereof and/or through the use of electrodes immersed within the molten bath. In either case, the tank was provided with a roof over the free surface and the firing of the combustible fuel over such surface provided for a hot crown. The firing of the combustible fuel and/or the immersed electrodes, provided energy to melt the batch material supplied at one end before being removed from an opposite end of the furnace.

In a cold-crown vertical melting furnace, such as shown in U.S. Pat. No. 4,429,402, a layer of batch material is provided upon and completely covers the surface of molten glass retained within the glass melter. The layer of batch serves both to contain the heat energy release adjacent the top of the molten glass and to provide the glass making materials necessary for melting. Electric power is introduced by means of electrodes which preferably extend through the batch layer and into the molten glass, and the melted glass is withdrawn from a central bottom portion of the furnace for delivery to a desired location.

Typically, the pull rate on a standard fuel-fired furnace is dictated by the forming process requirements. The fill rate is thus controlled to hold a target glass level in the distribution zone of the furnace. Since the glass level in such furnaces is actually a free surface, detectors are readily available to determine the level or fusion line of the glass in the distribution zone, and accordingly closed loop control to the furnace filling machines is a fairly simply process to implement. However, in cold-crown vertical melters, there is no free glass surface which can be easily measured. Further, it has been found that the height or thickness of the batch material on the surface or fusion line of the molten glass materially affects the resultant quality of glass produced by the melter, particularly when the batch material is composed of fairly fine raw materials in the range of about 300 mesh or finer.

Accordingly, the present invention sets forth a novel method of controlling the melting of batch materials in a cold-crown furnace by determining and controlling the height of the batch material maintained above the fusion line, i.e. the thickness of the batch blanket.

SUMMARY OF THE INVENTION

In its simplest form, the present invention sets forth a method of melting glass materials in a cold-crown or vertical melting furnace by continuously measuring at least two of three variables to determine the thickness of the batch blanket on the molten glass, and controlling such variables in order to maintain a desired or predetermined batch blanket thickness on the molten bath. In order to accomplish such control, it is necessary to be able to continuously measure at least two of the following: the height of the fusion line, the height of the batch blanket, and the effective hydrostatic head, as explained hereinafter. By knowing at least two of the above, the thickness of the batch blanket can be determined and controlled.

DESCRIPTION OF THE PREFERRED EMBODIMENTS

Figure 1:
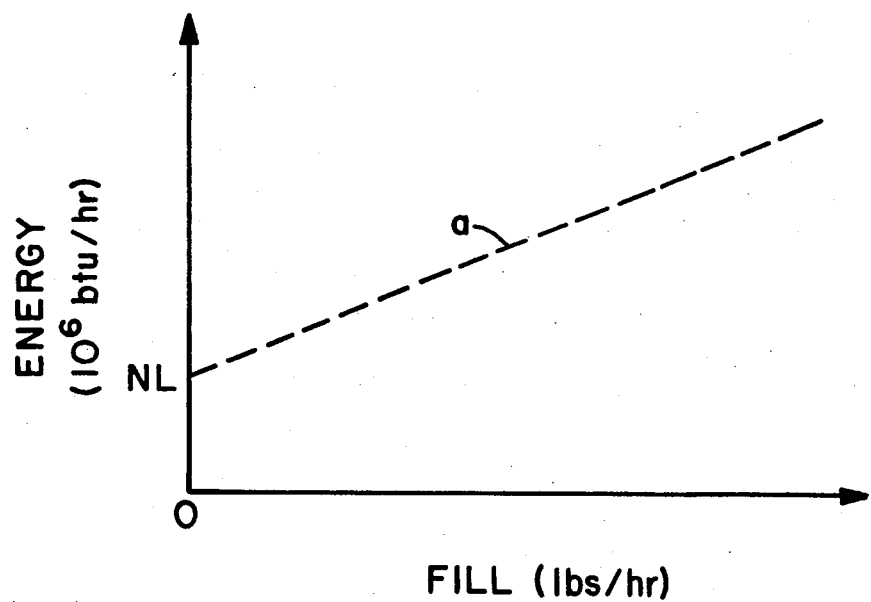
FIG. 1 is a graph illustrating the relationship of furnace energy input to furnace fill rate.

From a theoretical furnace heat balance point of view, it is known that the relationship of furnace energy input to furnace fill rate is similar to that shown in FIG. 1. That is, at a no load condition such as shown at 0 fill, the furnace structural heat losses must be satisfied at some minimum level, NL. Then, an incremental amount of power is required for each pound of fill or pull, as shown by line a. The incremental energy to fill component, can be fairly accurately calculated, knowing the oxide composition of the glass, the raw materials used, and the temperature of the glass as it leaves the furnace, as suggested by Sharp and Ginther, Journal of American Ceramic Society, 34, 260 (1951). (See also Hand Book of Glass Manufacture, Vol. 1, pgs. 20-23.)

Figure 2:
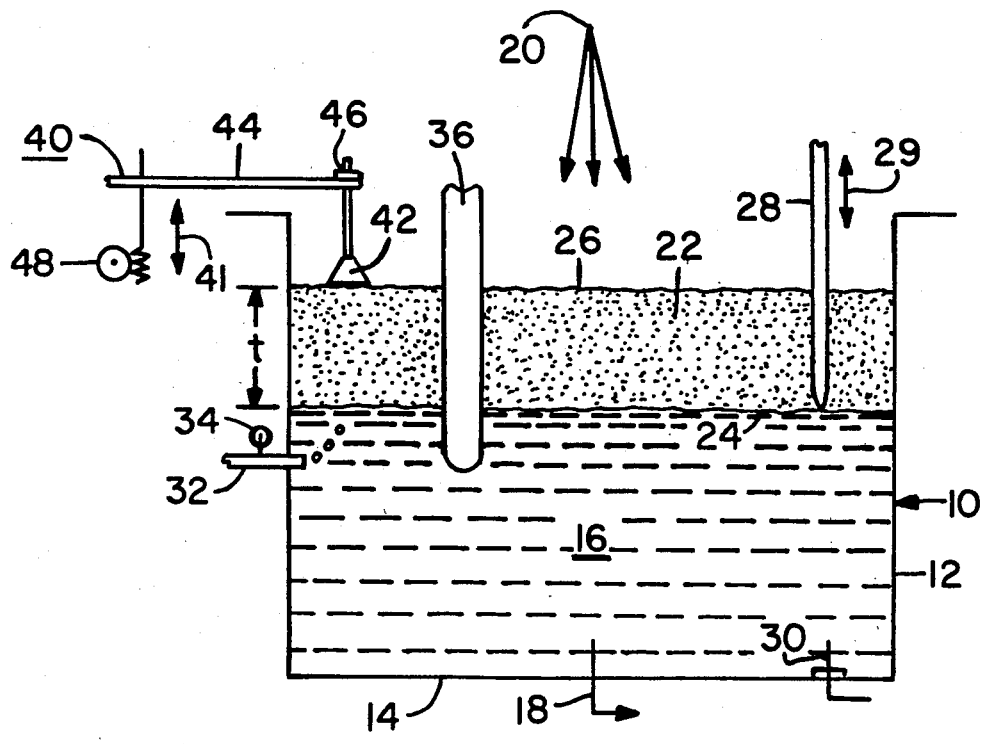
FIG. 2 is a schematic elevational view of a cold-crown vertical melting furnace, illustrating the various measurements which can be taken to control the thickness of the batch blanket on the molten glass.

FIG. 2 is a schematic illustration of a typical cold-crown or vertical melting furnace, but illustrating various measurement or control features of the present invention. The melting tank or furnace 10 is shown having sidewalls 12 and a bottom wall 14 which merely provide containment of the glass during the melting process. The molten glass 16 is delivered from the tank 10 through an outlet 18, usually positioned adjacent the center bottom of the furnace. A distributor 20 for batch material is utilized to distribute a batch blanket 22 on top of the molten glass 16. A fusion line 24 represents the boundary between the molten glass 16 and the batch blanket 22. That is, the fusion line is in fact both the top surface of the molten glass 16, and the bottom of the batch blanket 22. The blanket thickness t is the distance between the bottom of the blanket at the fusion line 24 and the blanket height or top of the blanket 26.

Although it is possible to calculate the theoretical energy to fill ratio, from a practical standpoint it is not possible to predict the exact amount of power required to maintain the fusion line at its targeted value, due to the numerous variables of heat loss, insulation properties, and so forth. As previously mentioned, the fusion line 24 is the boundary between the upper surface of the molten glass 16 and the bottom of the batch cover 22, and since it is not visible to a furnace operator, such as it is in a typical fuel-fired tank furnace, it must be detected by other means. One method is to utilize a pointed electrode or fusion probe 28, which is movable in a vertical direction shown by arrow 29. The probe 28 may be lowered through the batch blanket 22 until it is in contact with the fusion line 24 and completes an electrical circuit through the molten glass 16 to an inglass electrode 30. Although this method of determining the fusion line could be automated by reproduceably lowering the fusion probe 28 into the molten glass 16 until electrical conduction was obtained therethrough to produce a reading, such procedure has not proven suitable for closed-loop cascade control of power, since it is normally only made once during each operating shift. Further, when melting high resistivity glasses, it has been found that an automated measurement is not reliable, due to the nature of such glasses.

Typically, glass pull rate on a fuel-fired furnace is dictated by the requirements of the forming process utilizing the glass. Thus, the fill rate of batch material supplied to such a furnace is controlled to maintain a target glass level in the distribution zone of the furnace. Glass level detectors for such free surfaces (which are present in typical gas-fired melting tanks) are commercially available, and accordingly a standard closed-loop control system to the furnace filling machines is usually provided. However, in a cold-crown melter or vertical melting furnace, such as 10, there is no free glass surface which may be readily measured. Accordingly, since the fusion probe is not deemed to be a reliable instrument for closed loop control of the fusion line, the back pressure on a bubbler system is utilized to determine the effective hydrostatic head of the tank. As shown in FIG. 2, a bubbler tube 32, having a pressure gauge 34 thereon, projects through a sidewall 12 of the tank 10 to release a quantity of air into the molten glass 16 at a predetermined level in the tank.

Since the density of batch material forming the blanket 22 is known to be no more than two-thirds of the density of the molten glass, the measurement of the effective hydrostatic head produced by the bubbler 32, correlates very well with an average fusion line 24 when the blanket height 26 is fixed. That is, the back pressure read on gauge 34 from the bubbler 32 provides a measurement which is proportional to the level of glass and batch thickness over the bubbler tip. Due to the significant difference in density of the glass and batch blanket, knowing the blanket height 26, means that the fusion line 24 can be inferred from the hydrostatic head measurement shown by gauge 34. Accordingly, the hydrostatic head measurement 34 becomes an indicator of the average blanket thickness, when the blanket height 26 is held on target by regulating the fill rate.

It has been found that the thickness t of the batch blanket 22 must be carefully controlled in order to produce consistent quality molten glass. This is particularly true when utilizing very fine raw materials, such as within the range of about 300 mesh or finer, to be melted to form bath 16. Generally, a considerable amount of gas, such as $CO_2$, is generated during the melting process and must escape through the batch blanket. The amount of gas released is maximized on those processes where cullet is not available for remelting and the fill is 100% raw batch.

However, when the batch blanket exceeds a critical thickness the batch becomes "fluidized" from the gases attempting to escape, and segregation of the raw materials forming the batch blanket significantly increases, thus jeopardizing the quality of the molten glass produced. The critical thickness will of course vary, depending upon the fineness of the batch materials utilized, however when using very fine materials in the range of about 300 mesh, the critical batch blanket thickness at which fluidizing occurs appears to be about 1½ feet. I have found that very stable production and good product quality has been maintained with a batch blanket thickness in the range of about 12 to 15 inches, however thicknesses of greater than about 1½ feet creates batch segregation, whereas thicknesses of less than about ½ foot would be considered to be too thin a blanket as providing very little safety factor should there be a breakdown in the batch handling and filling system. Thus, for the first time, it has become recognized that it may be critical for the thickness of the batch blanket to be held within tighter limits than heretofore considered necessary, and accordingly, batch blanket thickness has become a desired control parameter which must be effectively maintained.

In order to better describe the method of controlling the batch thickness, reference is again made to FIG. 2 which is a schematic illustration of a cold-crown vertical melting furnace having a layer of batch material 22 floating on the surface 24 of the molten glass bath 16. The glass withdrawal rate through outlet or delivery 18 is dictated by the forming process being utilized, however the furnace operator would normally have the responsibility to regulate the batch fill rate provided by distributor 20 and the power input provided by suitable batch electrodes 36, to hold the fusion line 24 and blanket thickness t within their target ranges. However, without the present invention, the operator would have no means for so determining such thickness and thereby controlling the same, and accordingly the present invention sets forth a method for automatically controlling the thickness of the batch blanket. In order to accomplish such objective, a continuous measurement of the fusion line, blanket thickness, or blanket height is needed. As previously mentioned, the fusion probe has not been effective as a means for providing a continuous measurement of the fusion line which can be used in a closed loop control system with any degree of accuracy. It is a fact that a batch blanket thickness measurement would be difficult to obtain, while a batch height measurement 26 can be done by adapting existing technology. In combination with the hydrostatic head reading obtained with bubbler 32, the necessary signals are available for controlling batch blanket thickness.

As shown in FIG. 2, a batch level detector 40 is provided to measure the level or top 26 of the batch blanket. Although other suitable detectors may be used, the detector 40 may be on the order of a standard ocillating probe utilized in glass level measuring systems, but with the standard probe-type detection system replaced with a counterweighted cone-shaped float 42. The float is mounted so as to ride up on its support 44 as detector 40 is moved along arrow 41, and break an electrical contact 46 therewith, upon the float 42 contacting and being buoyed up by the surface 26 of the batch blanket. A suitable indicator or control 48 would receive the signal indicating the height 26 of the batch blanket 22.

It is thus possible to control the thickness of the batch blanket as long as two of the three main variables can be continuously measured. These variables include the level of the fusion line, the blanket height, and the effective hydrostatic head in the tank. Through the use of standard computer software and digital control, the signals can be easily averaged and a control strategy implemented to maintain the desired batch thickness. For example, since the energy to fill rate relationship is known as shown in FIG. 1, and the height or top 26 of the batch blanket is known from detector 40, the power supplied by the batch electrodes 36 can be ratioed to the desired fill rate, which in turn should be proportional to the production pull rate. Since the power ratio to fill should maintain the fusion line at substantially the desired level, by utilizing the effective hydrostatic head reading, the power can be trimmed so as to maintain the desired blanket thickness above the fusion line. Further, by using a cascade loop for trimming the power input to hold the effective hydrostatic head at its target value, tends to prevent long term drift in the fusion line.

Thus, the batch blanket thickness may be controlled by the following procedure. The height of the top 26 of the batch blanket 22 is measured by use of a detector, such as 40. A one-time manual measurement of the fusion line level 24 may be made, such as by probe 28. The thickness t of the batch blanket is then determined by subtracting the fusion line level 24 from the level of the blanket height 26. The effective hydrostatic head reading is obtained from bubbler 32 and gauge 34 at such known fusion line level. Assuming that the thickness is acceptable, the fill rate of the distributor 20 is regulated to maintain the level of the top of the batch blanket 22, and the power-to-fill rate for the pull on the furnace is determined, such as by the known relationship of FIG. 1. Such determined power is applied to the melter, such as by electrodes 36. And the effective hydrostatic head is monitored by bubbler system 32 to trim the power applied so as to maintain the fusion line level. Accordingly the thickness t of the batch blanket is controlled at a desired value by maintaining the top of the blanket at a desired level by the fill rate of distributor 20 as monitored by detector 40, and by maintaining the fusion line level at a desired value by using a determined power-to-input ratio and monitoring the fusion level with bubbler system 32. When the fill rates being utilized by a particular melter are relatively constant, the power input may be regulated to maintain a desired fusion line level as monitored by the effective hydrostatic head reading from bubbler system 32.

When the effective hydrostatic head reading increases, and the batch blank level is constant, this indicates that the fusion line level has risen, and power should be reduced. On-the-other hand, if a low reading is obtained by gauge 34 this indicates that the fusion line level has lowered, and more power is required to return to the desired level. If the determined thickness t of the blanket is greater or less than desired, an initial correction can be made to adjust the thickness to an acceptable level before implementing the described control system. For example if the blanket is too thick, the power can be increased to raise the fusion line level (giving an increased effective hydrostatic head reading on gauge 34), and/or the batch fill rate may be decreased to lower the level of the top of the blanket (giving a lower reading on gauge 48). Both of the above procedures would result in a decreased blanket thickness, and the procedures may be reversed to increase such thickness.

Although the now preferred embodiments of the invention have been disclosed, it will be understood that various changes and modifications may be made thereto without departing from the spirit and scope thereof as defined in the appended claims.

I claim:

1. A method of controlling the thickness of a batch blanket on the surface of molten glass contained within a glass melting furnace which comprises:
    measuring the height of said batch blanket;
    regulating the fill rate to maintain a desired blanket height;
    measuring the fusion line level at the surface of the molten glass,
    measuring the effective hydrostatic head of the molten glass and batch material within said furnace above a predetermined level at the known fusion line level; and
    regulating the power input to said furnace so as to maintain the desired effective hydrostatic head and maintain the predetermined fusion line between the molten glass and the batch blanket so as to control the thickness of said blanket.

2. A method of controlling the thickness of a batch blanket as defined in claim 1 including the step of measuring the effective hydrostatic head of the molten glass and batch material within said furnace by positioning a bubbler tube at a predetermined level within the molten glass, applying a pressure to said bubbler tube, and measuring the back pressure exerted on the tube to determine the effective hydrostatic head.

3. A method of controlling the thickness of a batch blanket as defined in claim 2 wherein said effective hydrostatic head includes the height of molten glass above said predetermined level and height of said batch blanket thereon, and factoring the density of said blanket to equate to that of the molten glass for interpreting said effective hydrostatic head reading.

4. A method of controlling the thickness of a batch blanket as defined in claim 1, wherein the height of said batch blanket is measured by contacting an upper surface of the blanket with a float device supported so as to provide a signal upon contacting and being buoyed up by the surface of said batch blanket.

5. A method of controlling the thickness of a batch blanket on the surface of molten glass contained within a glass melting furnace which comprises:
    measuring the following variables:
        (a) the level of the fusion line between the upper surface of the molten glass contained within the furnace and the bottom of the batch blanket thereon;
        (b) the height of the top surface of the batch blanket on the molten glass; and
        (c) the effective hydrostatic head of the molten glass and batch material within said furnace above a predetermined level for the measured fusion line level;
    utilizing such measured level of the existing fusion line and the blanket height to determine the blanket thickness therebetween;
    controlling the power input to said furnace to maintain a desired fusion line level while controlling the batch flow rate to maintain a desired batch blanket height on said fusion line and thereby control the batch thickness within the furnace.

6. A method of controlling the thickness of a batch blanket as defined in claim 5 including the step of measuring the height of the top surface of the batch blanket by utilizing a float device which contacts the upper surface and is buoyed up by such surface to produce a signal indicating the level of such surface.

7. A method of controlling the thickness of a batch blanket as defined in claim 5 including the step of determining the effective hydrostatic head of the molten glass and batch material within the furnace by providing a bubbler at a predetermined level within the molten glass and measuring the back pressure exerted on the bubbler while compensating for the difference between the densities of the batch material and the molten glass to determine the effective hydrostatic head.

8. A method of controlling the thickness of a batch blanket as defined in claim 5 including the step of determining the thickness of the batch blanket by subtracting the level of the determined fusion line level from the level of the measured blanket height.

9. A method of controlling the thickness of a batch blanket as defined in claim 5 including the step of monitoring the effective hydrostatic head of the molten glass and batch material within said furnace for adjusting the power input to said furnace and maintaining the desired fusion line level.

10. A method of controlling the thickness of a batch blanket as defined in claim 5 including the step of monitoring the height of the batch blanket for controlling the batch fill rate so as to maintain a desired batch blanket height above said fusion line.

11. A method of controlling the melting of batch materials in a cold-crown glass melting furnace which comprises:
providing a bath of molten glass within said furnace;
providing a blanket of batch material to be melted on the surface of said bath of molten glass;
measuring the height of the batch blanket on said molten bath;
controlling the fill rate of batch material to the furnace to maintain a desired height of batch material on the bath of molten glass;
measuring the level of the fusion line between the surface of the molten glass and the bottom of the batch blanket;
measuring the effective hydrostatic head of the molten glass and the batch blanket thereon above a predetermined level at the known level of the fusion line between the surface of the molten bath and the bottom of the batch blanket;
determining a power-to-fill ratio based upon the oxide composition of the batch material;
applying power to the molten bath in accordance with the determined power-to-fill ratio;
monitoring the effective hydrostatic head; and
trimming the input power in accordance with the value of the hydrostatic head so as to effectively maintain a constant fusion line level.

12. A method of controlling the melting of batch material as defined in claim 11 including the step of maintaining a constant thickness of batch material on the molten bath by regulating both the rate of fill of batch material to the furnace and the power input to the furnace.

13. A method of controlling the melting of batch material as defined in claim 11 including the step of subtracting the level of the batch material from the level of the fusion line so as to determine the thickness of the batch blanket between the fusion line and the top of the batch blanket.

14. A method of controlling the melting of batch material as defined in claim 11 including the step of controlling the thickness of the batch blanket on the molten glass by monitoring the level of the batch blanket and the effective hydrostatic head and adjusting the power input and the rate of batch distribution to maintain the desired batch blanket thickness.

15. A method of controlling the melting of batch material as defined in claim 11, wherein the effective hydrostatic head is obtained by measuring the back pressure exerted upon a bubbler tube positioned at a predetermined level within the molten bath.

* * * * *